United States Patent
Pohnan et al.

(10) Patent No.: US 12,246,680 B2
(45) Date of Patent: Mar. 11, 2025

(54) AUTOMOBILE ACCESSORY

(71) Applicant: JAGUAR LAND ROVER LIMITED, Warwickshire (GB)

(72) Inventors: Lukas Pohnan, Warwickshire (GB); Mudassir Parack, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 213 days.

(21) Appl. No.: 17/597,391

(22) PCT Filed: Jul. 6, 2020

(86) PCT No.: PCT/EP2020/068950
§ 371 (c)(1),
(2) Date: Jan. 4, 2022

(87) PCT Pub. No.: WO2021/004990
PCT Pub. Date: Jan. 14, 2021

(65) Prior Publication Data
US 2022/0266757 A1  Aug. 25, 2022

(30) Foreign Application Priority Data
Jul. 5, 2019  (GB) ...................................... 1909706

(51) Int. Cl.
*B60R 9/00*  (2006.01)

(52) U.S. Cl.
CPC ...................................... *B60R 9/00* (2013.01)

(58) Field of Classification Search
CPC .............. B60R 9/00; B60R 9/02; B60R 9/042
See application file for complete search history.

(56) References Cited

U.S. PATENT DOCUMENTS 3,878,955 A    4/1975  Udden
4,887,750 A *  12/1989  Dainty .................. B60R 9/0423
                                                224/310

(Continued)

FOREIGN PATENT DOCUMENTS

CA        2532950 A1    7/2007
CN      108407726 A     8/2018

(Continued)

OTHER PUBLICATIONS

China National Intellectual Property Administration, Office Action and Search Report Issued in Application No. 202080056351.8, May 20, 2023, 17 pages.

(Continued)

*Primary Examiner* — Corey N Skurdal
(74) *Attorney, Agent, or Firm* — McCoy Russell LLP

(57) ABSTRACT

Aspects of the present disclosure relate to an automobile accessory comprising first and second attachment means configured to engage with attachment locations provided on an automobile to mount the accessory to the automobile, wherein: the first attachment means comprises a first fixing element configured to engage with a first attachment location on a roof of the automobile, and the second attachment means comprises a second fixing element configured to engage with a second attachment location on a side of the automobile at or above a waistline of the automobile such that the accessory, when mounted to the automobile, is mounted on the side of the automobile.

19 Claims, 10 Drawing Sheets

(56) References Cited

U.S. PATENT DOCUMENTS

| | | | |
|---|---|---|---|
| 5,154,563 A * | 10/1992 | Phillips | B60R 9/0426 |
| | | | 224/326 |
| 6,412,675 B1 | 7/2002 | Pope | |
| 10,717,392 B2 * | 7/2020 | Engelke | B60K 15/06 |
| 2013/0154617 A1 | 6/2013 | Kawaguchi et al. | |
| 2018/0029656 A1 | 2/2018 | Barnes | |
| 2019/0152404 A1 | 5/2019 | Engelke | |

FOREIGN PATENT DOCUMENTS

| | | |
|---|---|---|
| DE | 9013120 U1 | 11/1990 |
| FR | 2958235 A1 | 10/2011 |
| GB | 2043004 A | 10/1980 |

OTHER PUBLICATIONS

Great Britain Intellectual Property Office, Combined Search and Examination Report under Sections 17 and 18(3) Issued in Application No. GB1909706.2, Jan. 8, 2020, 8 pages.

ISA European Patent Office, International Search Report and Written Opinion Issued in Application No. PCT/EP2020/068950, Sep. 18, 2020, WIPO, 11 pages.

* cited by examiner

AUTOMOBILE ACCESSORY

CROSS REFERENCE TO RELATED APPLICATIONS

The present application is a U.S. National Phase of International Application No. PCT/EP2020/068950 entitled "AN AUTOMOBILE ACCESSORY", and filed on Jul. 6, 2020. International Application No. PCT/EP2020/068950 claims priority to Great Britain Application No. 1909706.2, entitled "AN AUTOMOBILE ACCESSORY", and filed on Jul. 5, 2019. The entire contents of each of the above-listed applications are hereby incorporated by reference for all purposes.

TECHNICAL FIELD

The present disclosure relates to an automobile accessory. Aspects of the disclosure relate, but are not limited, to an automobile accessory, an automobile accessory mounting arrangement, and an automobile.

BACKGROUND AND SUMMARY

It is known for vehicles such as automobiles to comprise a loadspace compartment, typically behind a passenger compartment, within which items may be loaded and transported internally within the vehicle. It is often desirable to be able to transport items externally of the vehicle, for example when an item is to large or bulky to be conveniently transported within the vehicle, to prevent water, dirt, etc. from the item(s) contaminating the interior of the vehicle, or to enable more convenient access to the items from the outside of the vehicle.

Existing solutions for transporting items externally of a vehicle such as an automobile involve either mounting the items on the roof of the vehicle, for example by way of a roof rack or the like, or mounting the items to the rear of the vehicle, for example mounted to a tailgate or on a tow-bar of the vehicle. However, existing solutions may not be convenient for some automobiles. It is therefore an aim of the present disclosure to address one or more of the disadvantages associated with the prior art.

Aspects and embodiments of the disclosure provide an automobile accessory comprising first and second attachment means configured to engage with attachment locations provided on an automobile to mount the accessory to the automobile, wherein: the first attachment means comprises a first fixing element configured to engage with a first attachment location on a roof of the automobile, and the second attachment means comprises a second fixing element configured to engage with a second attachment location on a side of the automobile at or above a waistline of the automobile such that the accessory, when mounted to the automobile, is mounted externally on the side of the automobile.

By providing such an accessory comprising attachment means configured to engage with attachment locations provided on an automobile to mount the accessory to the automobile, the accessory is able to be mounted directly to the automobile without the need for additional attachment apparatus such as a mounting rack or the like.

Furthermore, by configuring the attachment means such that the accessory is mounted externally on the side of the automobile, as opposed to being mounted on the roof of the vehicle, the accessory is more easily accessible when mounted to the vehicle.

Furthermore, by mounting the accessory above the waistline of the automobile, the accessory is mounted on a part of the vehicle where the side of the vehicle typically angles inwardly (from the waistline), thereby allowing the accessory to be mounted in such a manner that does not significantly increase the width of the vehicle, and for instance, such that the accessory does not extend beyond the homologated width of the vehicle (e.g. does not extend wider than the external rear view mirrors or cameras mounted on the side of the vehicle).

Optionally the first attachment location on the roof of the automobile is a roof rail and the first fixing element is configured to engage with the roof rail. The first fixing element may comprise a T-shaped profile configured to be slideably received within a channel of the roof rail. In an embodiment the fixing element comprises a bolt and slider, the slider comprising a threaded bore within which the bolt is received to form the T-shaped profile.

The first attachment means of the accessory optionally comprises an arm configured to extend, in use, over a longitudinal edge of the roof of the automobile, and the first fixing element is configured to attach an end of the arm to the first attachment location on the roof of the automobile. The end of the arm may comprise an engagement feature configured to engage the first fixing element. The engagement feature of the arm may comprise an aperture through which the fixing element is able to pass to engage with the attachment means located on the roof of the automobile. The first fixing element optionally comprises a flange arranged to engage with a surface of the arm adjacent to the aperture to prevent the first fixing element from passing completely through the aperture.

The arm may be shaped to follow an external profile of the side of the automobile and/or may comprise a smooth a-surface. In an embodiment the arm is made from a non-metallic material.

The first attachment means of the accessory optionally comprises a first arm and a second arm, each of the first arm and the second arm being configured to extend, in use, over the longitudinal edge of the roof of the vehicle and be spaced longitudinally with respect to the automobile.

The second attachment means may comprise a flange comprising an aperture through which the second fixing element is able to pass.

Optionally the second fixing element is configured to engage with the second attachment location positioned within a waistline reinforcement structural component of the automobile.

In an embodiment the second fixing element comprises a bolt and a seal member having a bore through which the bolt passes, the seal member being compressible to form a seal when the bolt of the second fixing means is fixed to an automobile component.

The accessory optionally comprises a storage container. The storage container may comprise a lockable enclosed storage container.

Optionally, the storage container comprises a body and a lid that define a storage compartment. The lid may be configured to enable access to the storage compartment when the accessory is mounted on an automobile.

A seal means may be provided between the body and the lid such that when the lid is closed water is inhibited from entering the storage box via the opening.

The lid may be coupled along an upper portion of the body of the storage container, for example by way of a hinge. The lid may be configured to open in a vertical upwards direction, and may be configured, when mounted on an automobile, to form a canopy over the storage compartment when in an open condition. A retention mechanism may be provided between the body of the storage container and the lid to retain the lid in an open condition. Such a retention mechanism may comprise an over centre mechanism.

According to another aspect of the disclosure there is provided an automobile accessory mounting arrangement; the accessory mounting arrangement comprising: a first attachment location on a roof of the automobile, and a second attachment location on a side of the automobile at or above a waistline of the automobile, wherein the first and second attachment locations are located with respect to one another to enable an accessory to be mounted thereto such that the accessory, when mounted to the automobile, is mounted on a side of the automobile.

The first attachment location is optionally proximal to a side of the roof adjacent the side of the automobile on which the second attachment means is locatable.

In an embodiment the first attachment location is arranged to enable attachment of an accessory thereto at multiple locations. The first attachment location may be arranged to enable attachment of an accessory thereto at multiple locations spaced longitudinally with respect to the automobile.

Optionally the first attachment location comprises a roof rail. In an embodiment the roof rail is surface-mountable to a roof panel of the automobile. Optionally the roof rail comprises a channel configured to receive and retain T-shaped fixing elements.

The second attachment location may be within a waistline reinforcement structural component of the automobile.

Optionally the second attachment location is below a glazed panel of the automobile.

According to another aspect of the disclosure there is provided an automobile comprising an automobile accessory mounting system and/or an automobile accessory. Optionally the side of the automobile on which the second attachment location is located is angled inwardly from a vertical longitudinal plane above a waistline of the automobile.

Within the scope of this application it is expressly intended that the various aspects, embodiments, examples and alternatives set out in the preceding paragraphs, in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the disclosure will now be described, by way of example only, with reference to the accompanying drawings, in which.

DETAILED DESCRIPTION

An automobile accessory and an automobile comprising an automobile accessory mounting arrangement in accordance with embodiments of the present disclosure are described herein with reference to the accompanying FIGS. 1 to 12B.

Figure 1:
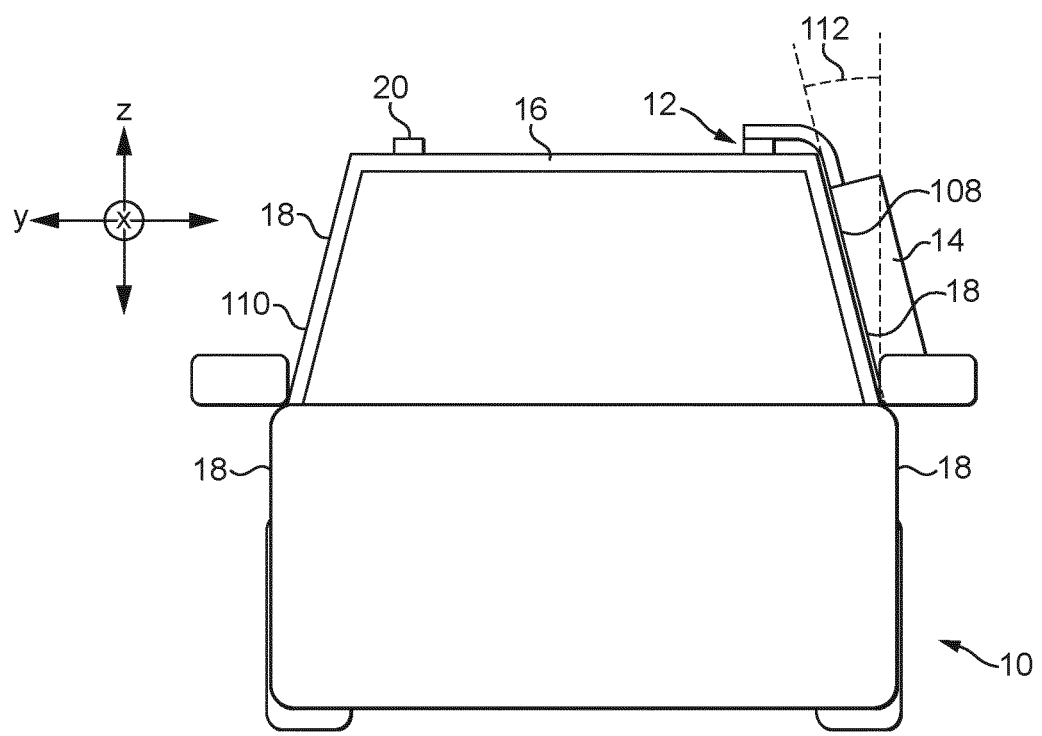
FIG. 1 shows a schematic representation of an automobile and an automobile accessory in accordance with an embodiment of the disclosure.

With reference to FIG. 1, there is illustrated a simplified frontal view of an automobile 10 comprising an automobile accessory mounting arrangement 12, and an automobile accessory 14 mounted thereto. The automobile is, in certain embodiments, a car, SUV, or the like. The automobile comprises a roof 16 and sides 18. In a normal forward direction of travel the automobile moves in an x direction as represented by the axes in FIG. 1.

Figure 2:
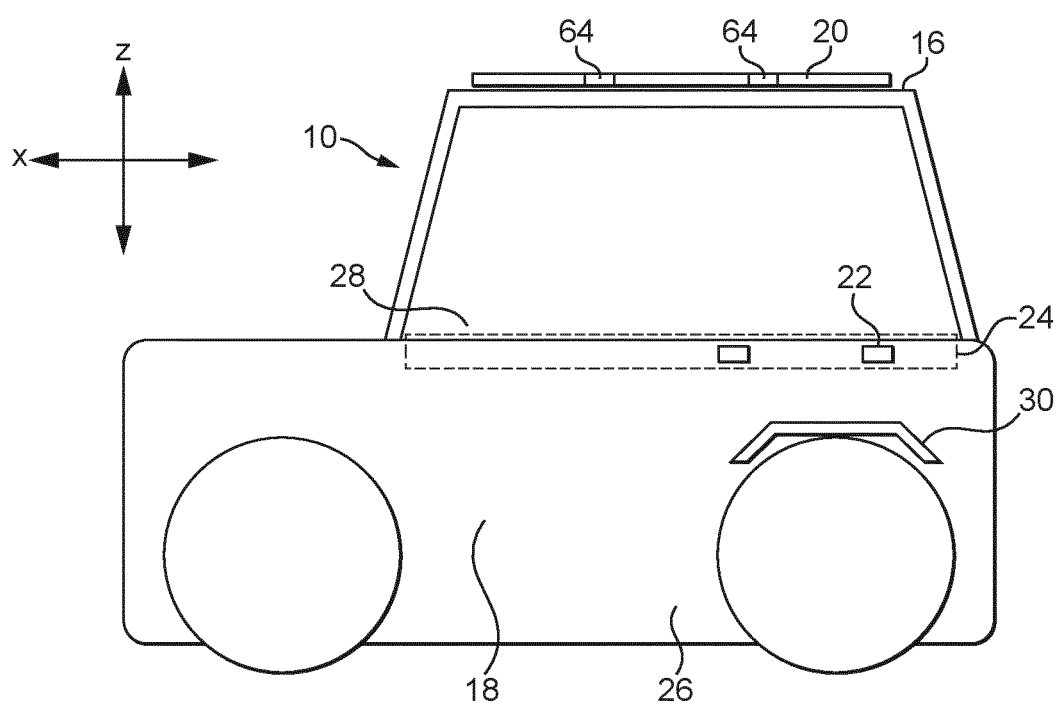
FIG. 2 shows a schematic representation of an automobile and an automobile accessory mounting arrangement in accordance with an embodiment of the disclosure.

As shown in FIG. 2 the automobile comprises a first attachment location 20 and a second attachment location 22. In an embodiment the first attachment location comprises a roof rail as conventionally used to carry items such as a roof rack. The roof rail 20 comprises a channel as discussed below. In an embodiment the second attachment location 22 is positioned at the waistline 24 of the automobile. The term waistline is a term of art and generally refers to the portion of the automobile body 26 adjacent to the lower part of the windows 28. The second attachment location 22 comprises a portion of the body in white of the automobile. The body in white is also a term of art and generally refers to the structural body of the automobile 10. Other arrangements for the location of the second attachment location 22 are within the scope of the disclosure, for example the second attachment location 22 could be positioned on or adjacent to the wheel arches 30. In an embodiment of the disclosure the first attachment location of the automobile comprises one roof rail and the second attachment location of the automobile comprises two portions of the body in white. Other arrangements may also be useful.

Figure 3:
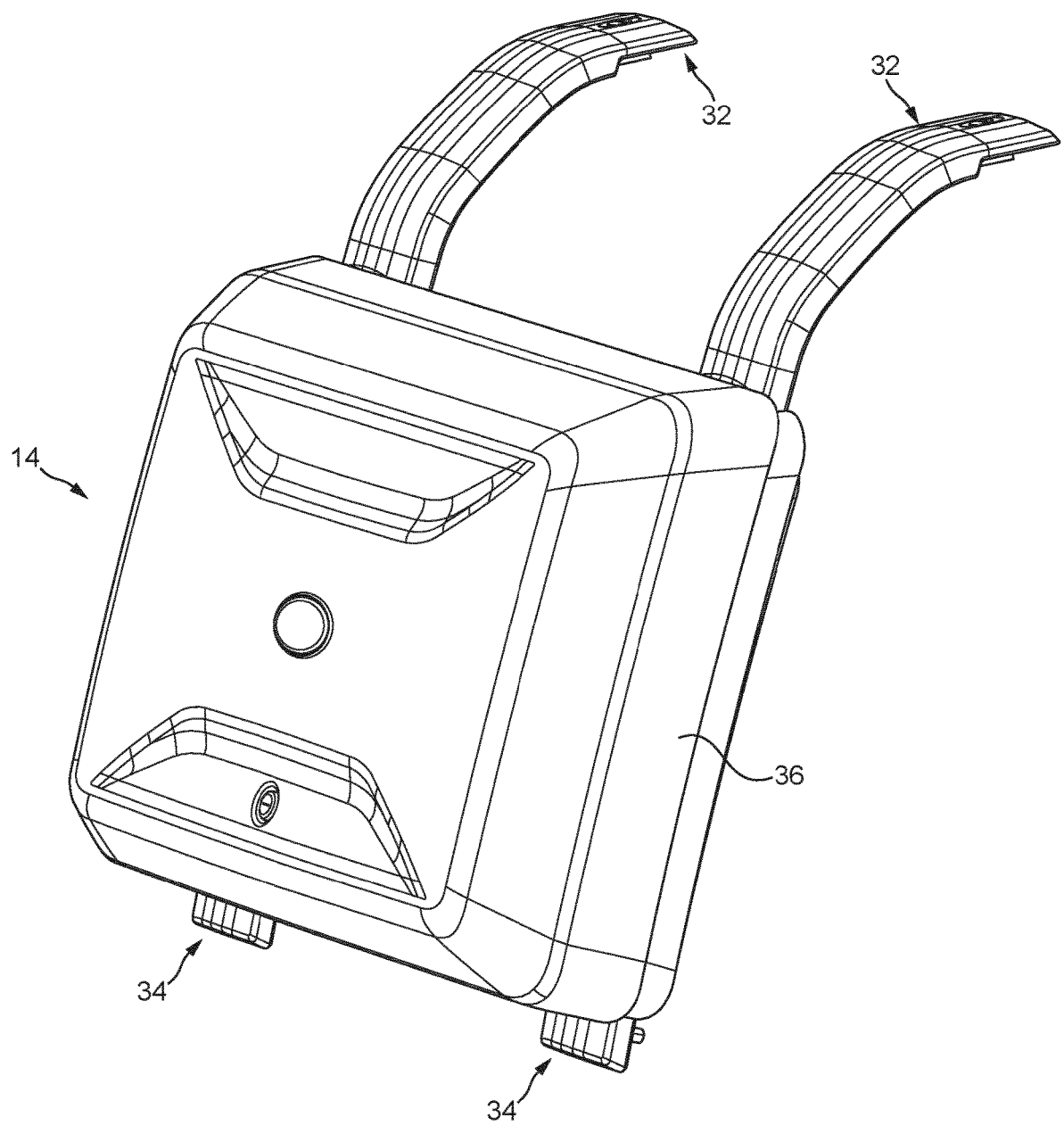
FIG. 3 shows a perspective view of an automobile accessory in accordance with an embodiment of the disclosure.

FIG. 3 shows an automobile accessory 14 suitable for attachment to an automobile comprising a first and second attachment locations 20, 22 as described above. The automobile accessory comprises a first attachment means 32 and a second attachment means 34. In the embodiment shown the automobile accessory 14 comprises two first attachment means 32 and two second attachment means 34. Other numbers of first and second attachment means 30, 32 may also be useful. It will be understood that where the following description refers to one or more of the first and second attachment means, the description can be applied to any number of first and second attachment means. The automobile accessory shown is a storage box 36. In other embodiments the automobile accessory is a ladder, a wheel or the like.

Figure 4:
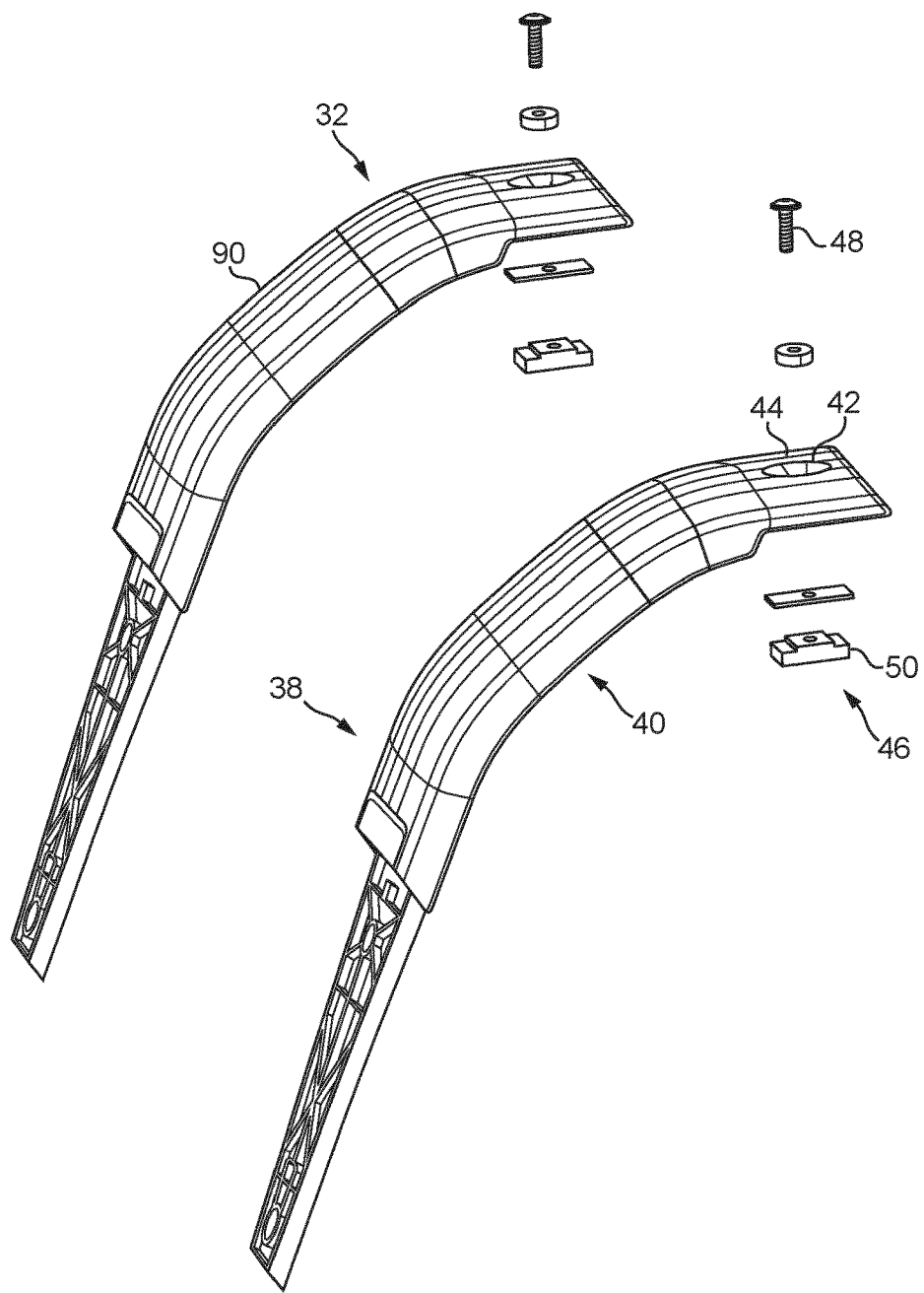
FIG. 4 shows a portion of an automobile accessory in accordance with an embodiment of the disclosure.

FIG. 4 shows the first attachment means 32 of the automobile accessory 14. The first attachment means comprises an arm 38 having a profile shape 40 which closely follows the shape of the automobile side to roof profile over which the arm extends. The arm has a smooth a-surface 90 which may reduce turbulent air flowing over the arm 38 when the accessory is applied to an automobile and the automobile is travelling in its normal direction.

Figure 5:
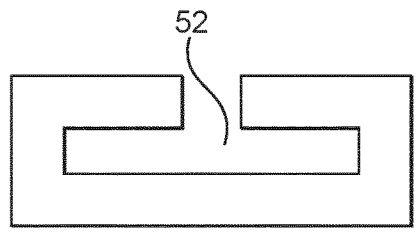
FIG. 5 shows a cross section of a roof rail of an automobile accessory mounting arrangement in accordance with an embodiment of the disclosure.

The arm comprises an engagement feature 42. In an embodiment the engagement feature comprises an aperture 44. A first fixing element 46 is arranged to pass through the aperture and comprises a bolt 48 and a slider 50. In an embodiment the slider has an inverted T shape. The slider 50 is shaped to engage with an internal cross section or channel 52 of the roof rail 20 as shown in FIG. 5.

Figure 6:
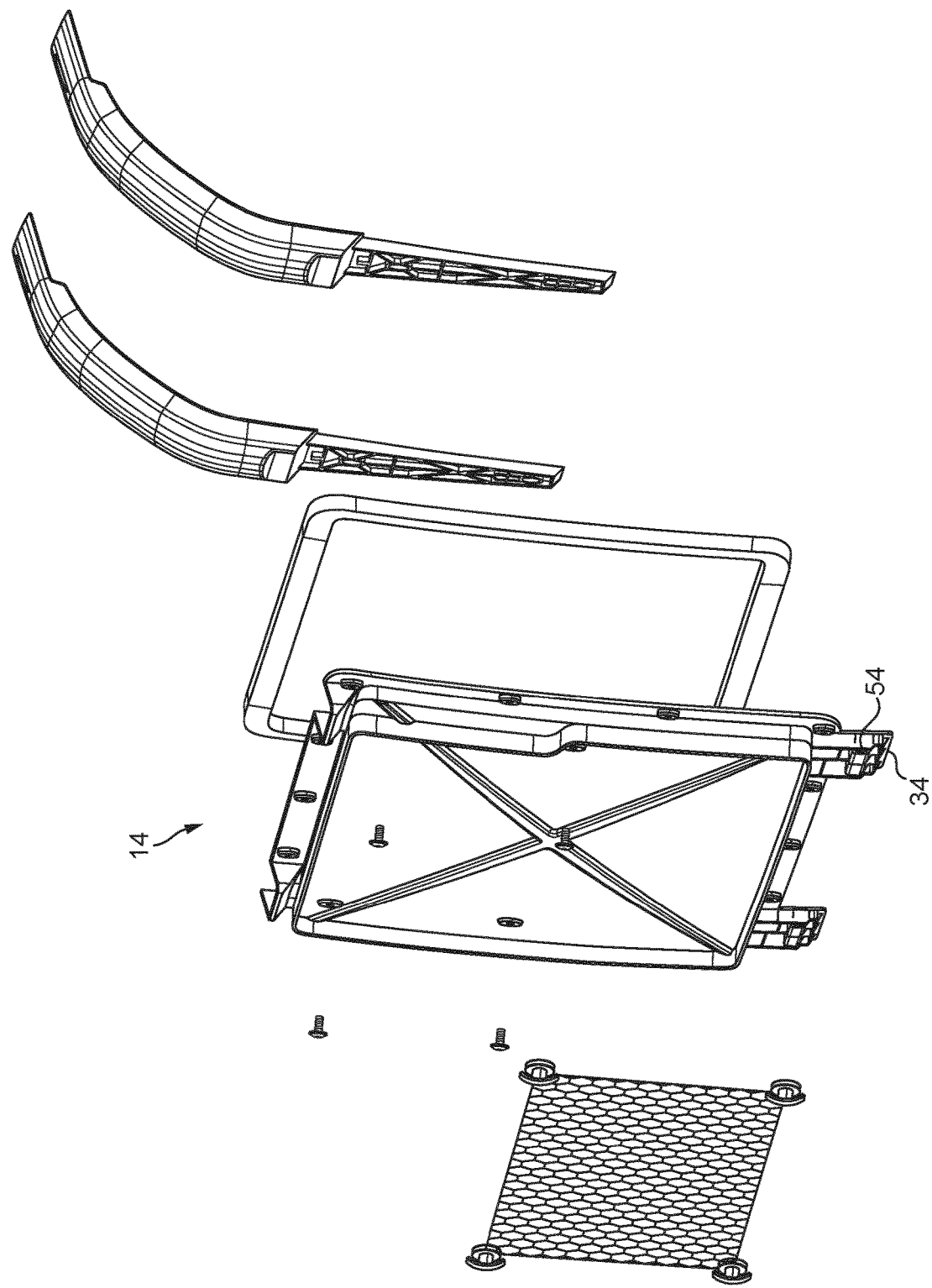
FIG. 6 shows an exploded perspective view of an automobile accessory in accordance with an embodiment of the disclosure.
Figure 7:
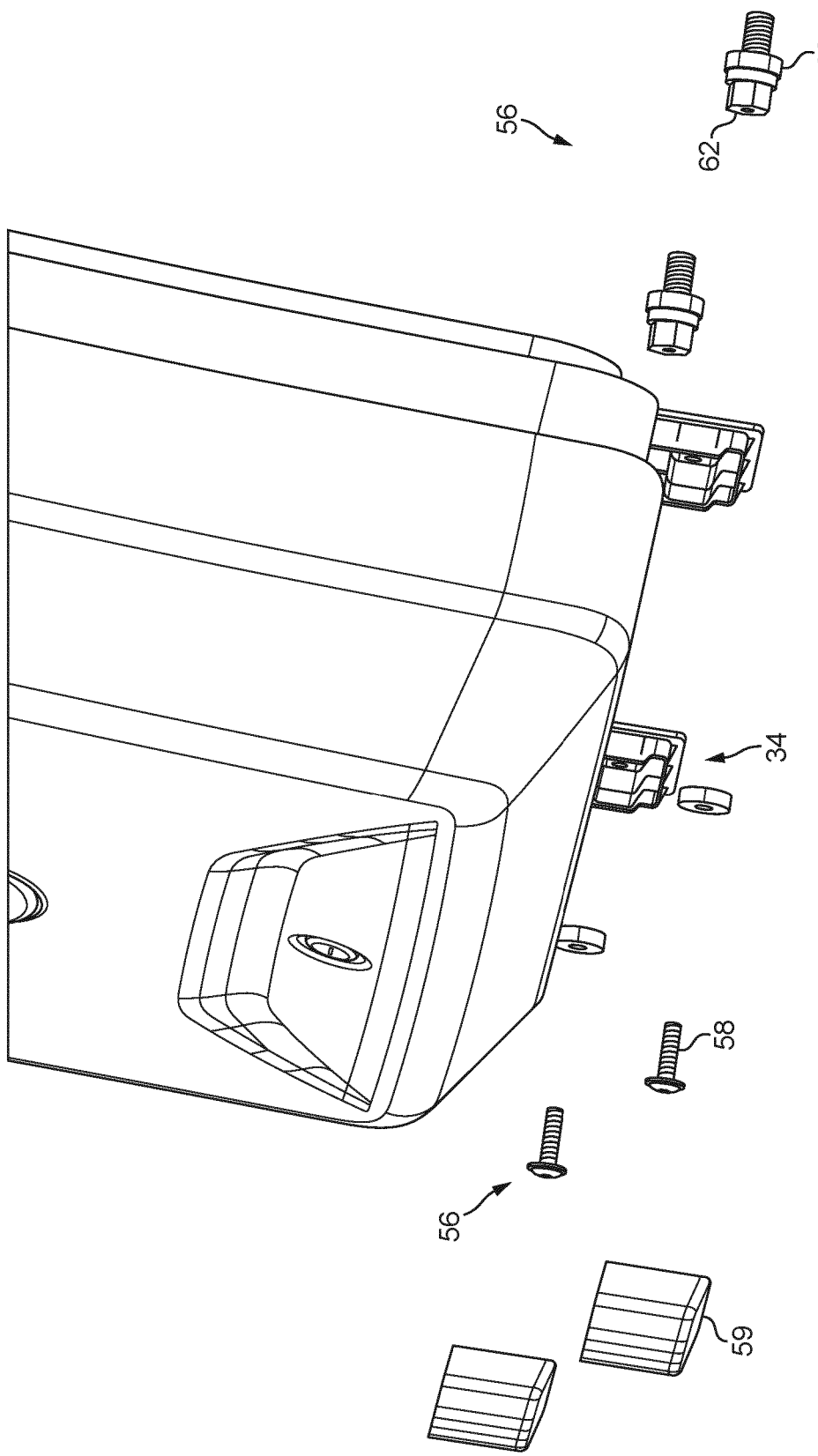
FIG. 7 shows a second attachment means of an automobile accessory in accordance with an embodiment of the disclosure.

FIG. 6 shows an automobile accessory 14 according to an embodiment of the disclosure. As shown the accessory comprises a second attachment means 34 which comprises an aperture 54. With reference to FIG. 7, the second attachment means of the automobile accessory comprises a second fixing element 56 which comprises a bolt 58 and a compressible seal 60. The seal 60 has a bore 62 through which the bolt 58 is arranged to pass.

With reference to FIGS. 1 to 7, to attach the automobile accessory 14 to an automobile 10 as shown in FIG. 1, the first fixing element 46 is first located in the roof rail 20. A longitudinally offset opening 64 of the roof rail channel 52 permits entry of the first fixing element 46 into the channel Once inserted the first fixing element, and thereby the accessory, can be slid longitudinally so that the second attachment means 34 of the automobile accessory 14 aligns with the second attachment location 22 of the automobile 10. On alignment the bolt of the second fixing element can be fixed to the second attachment location or body in white as mentioned above. Fastening of the bolt 58 compresses the compressible seal and may seal the body in white thus preventing water ingress through the any hole created by the bolt 58. Furthermore, fastening of the bolt brings the first attachment means of the accessory into tension thus preventing the first fixing element 46 from leaving the channel 52.

Figure 8:
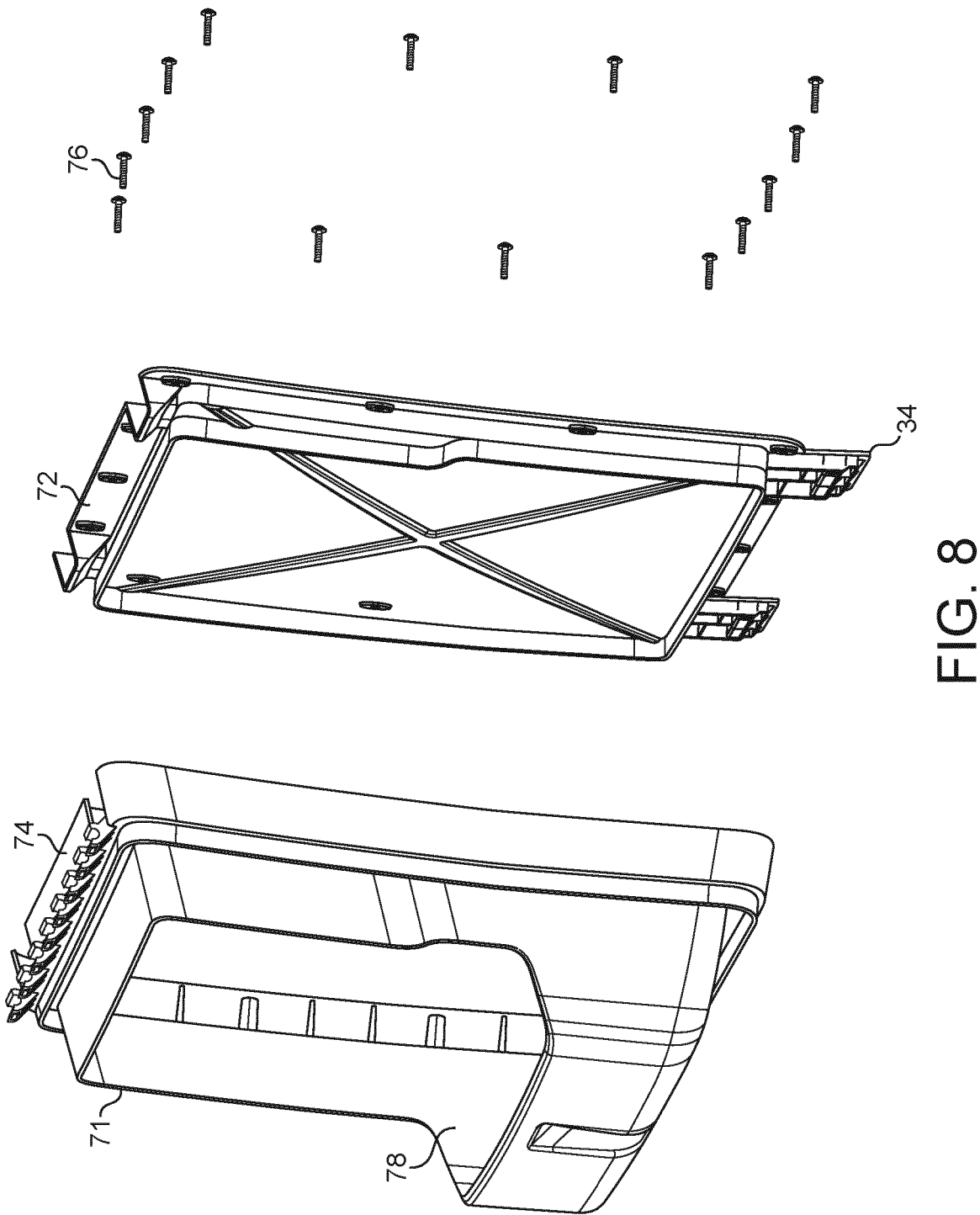
FIG. 8 shows an exploded perspective view of an automobile accessory in accordance with an embodiment of the disclosure.

FIG. 8 shows an example automobile accessory in the form of a storage box 36. The storage box 36 comprises a backboard 72 and wall section 74. The backboard 72 comprises the aforementioned second attachment means 34 and is fixable to the first attachment means as previously described. In the illustrated embodiment, the wall section is fixed to the backboard using a plurality of fixings 76, for example screws or bolts. However, it is contemplated that the wall section may be fixed to the backboard in any suitable manner, or alternatively may be integrally formed with the backboard. In the example embodiment of FIG. 8 the wall section 74 comprises a pocket 78, forming a part of a storage compartment 70, which may be used to retain items in the storage box.

Figure 9:
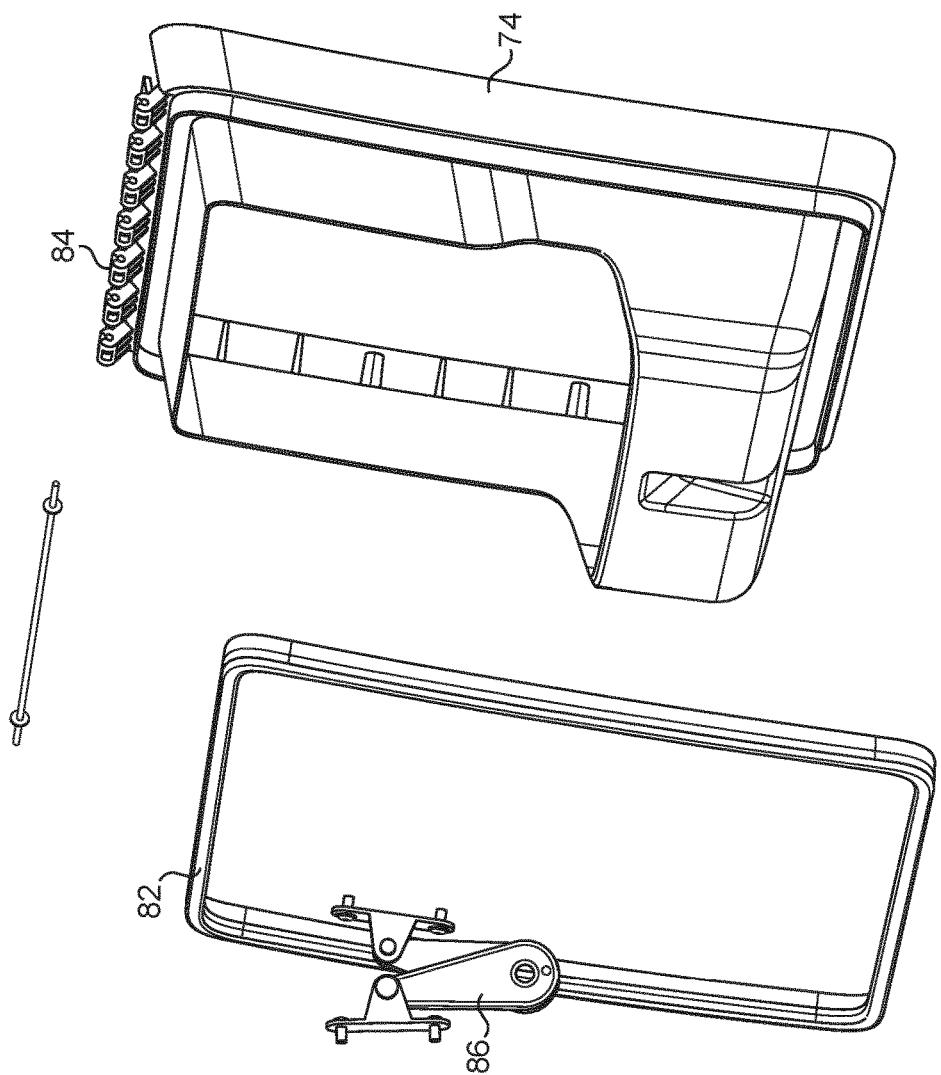
FIG. 9 shows an exploded perspective view of an automobile accessory in accordance with an embodiment of the disclosure.
Figure 9:
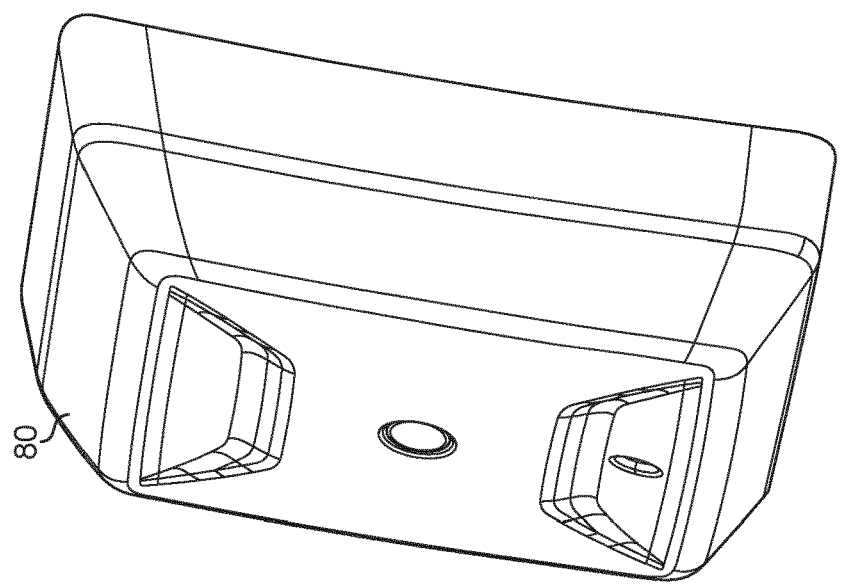

Turning to FIG. 9, the automobile accessory is shown in an expanded form to comprise the wall section 74, and a lid or door 80. The backboard 72 and wall section 74 combine to form a body of the storage box 36 whereby the body and lid 80 (when closed as illustrated in FIG. 9) define the storage compartment 70 of the storage box 36. The lid 80 is configured to enable access to the storage compartment 70 when the storage box 36 is mounted to the automobile 10 via an opening 71, which in the illustrated example is defined by the wall section 74.

A seal means 82 is provided between the wall section 74 and the lid 80 so that when the lid is closed water inhibited from entering the storage box 36 via the opening 71. The lid 80 is coupled to the wall section by a hinge 84 positioned along the upper portion of the wall section and lid. As such the lid hinges to open in a vertical upwards direction. This enables the lid to form a canopy over the storage box in adverse weather conditions as is discussed in relation to FIG. 12 below. An over centre mechanism 86 is provided between the wall section 74 and the lid 80 and is used to hold the lid in the open position.

Figure 10:
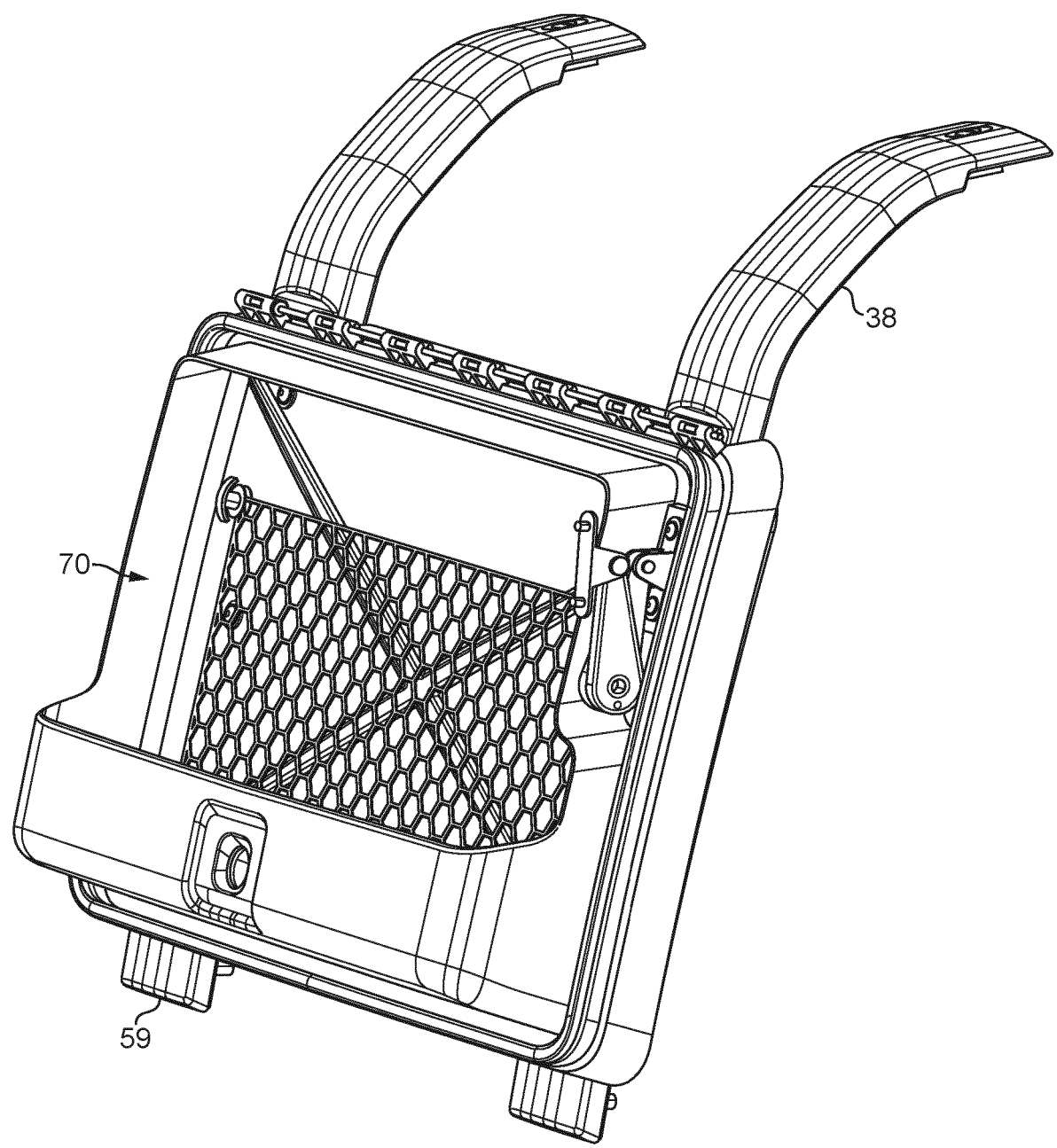
FIG. 10 shows a perspective view of an automobile accessory in accordance with an embodiment of the disclosure.
Figure 11A:
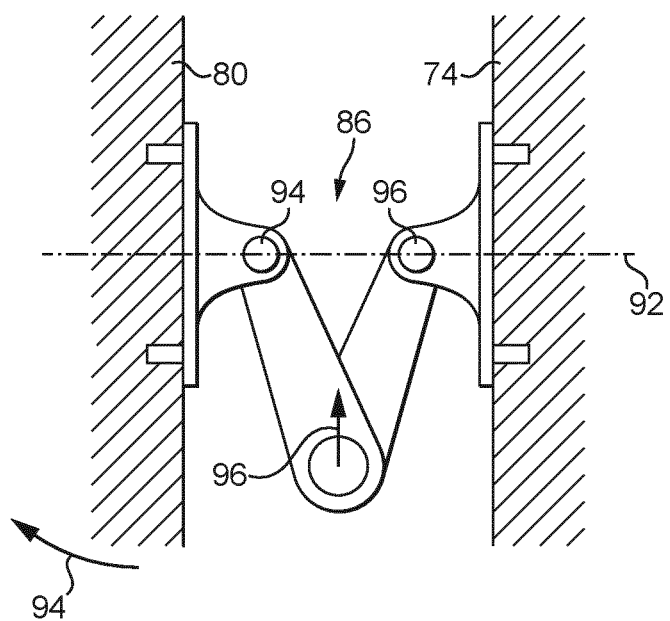
FIGS. 11A and 11B show a schematic view of the operation of an over centre mechanism of an automobile accessory in accordance with an embodiment of the disclosure.
Figure 11B:
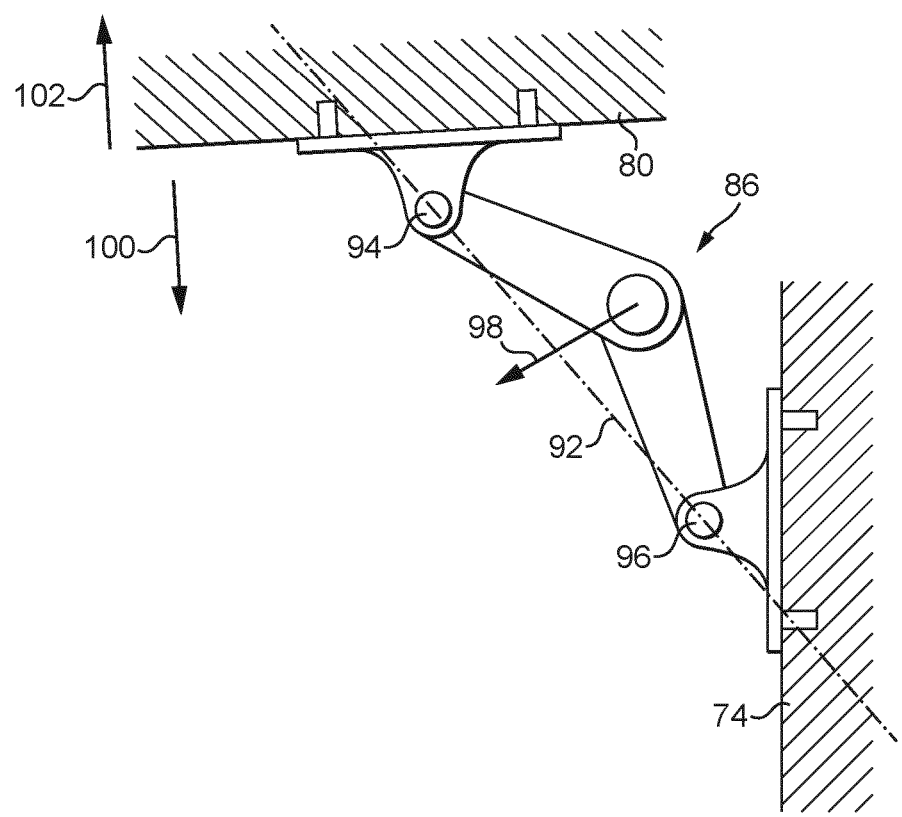

FIG. 10 shows the arms 38, backboard 72, wall section 74, and over centre mechanism 86 assembled together. FIGS. 11A and 11B show the over centre mechanism 86 when in a position whereby the lid as coupled thereto is closed (FIG. 11A) and open (FIG. 11B). A centre line 92 is illustrated between pivot points 94, 96 each coupling the over centre mechanism to the lid 80 and the backboard 74. As shown in FIG. 11A the lid 80 can freely move in a direction 94 towards an open configuration permitted by the over centre mechanism moving towards the centre line in a direction indicated by the arrow 96. Conversely, in the open configuration (shown in FIG. 11B) the over centre mechanism 86 is prevented from moving in a direction 98 toward the centre line 92 by a gravitational force 100 acting on the lid. In an embodiment, this keeps the lid in the open position. A lifting force has to be applied in an opposing direction 102 to lift the lid to enable the over centre mechanism to move in the direction 98 towards and over the centre line 92 in order to close the lid. It will be understood that to reach the open condition the lifting force has to be applied in the direction 102 to allow the over centre mechanism to pass over the centre line in a direction opposite to the arrow 98.

Figure 12B:
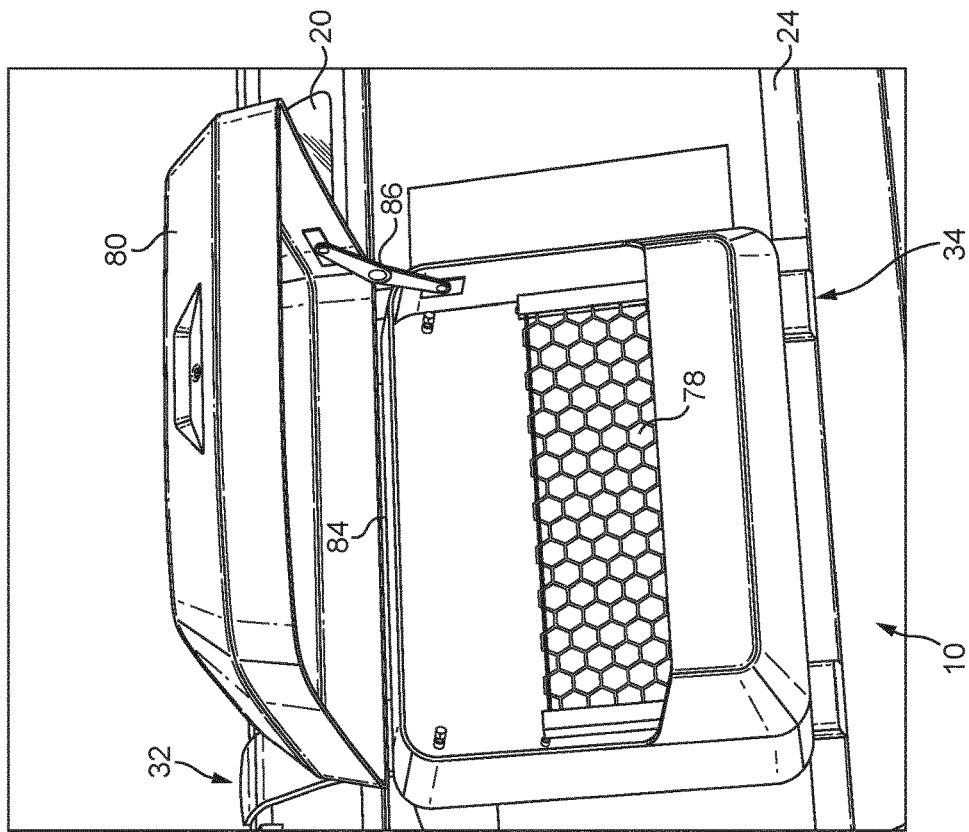
FIGS. 12A and 12B show a partial perspective representation of an automobile and an automobile accessory in accordance with an embodiment of the disclosure.
Figure 12A:
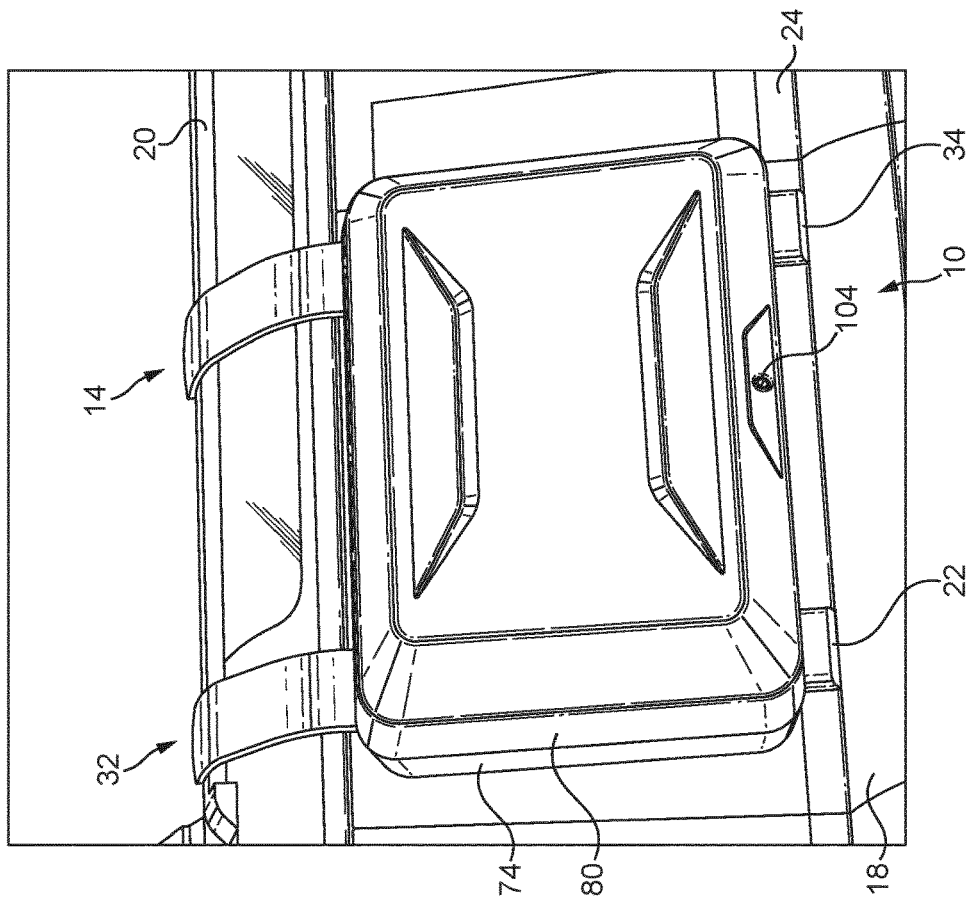

FIGS. 12A and 12B shows a perspective view of an automobile accessory 14 applied to an automobile 10 each as described in the foregoing embodiments. FIG. 12A shows the closed condition in which the lid 80 is closed to seal the storage box 36. FIG. 12B shows the open condition in which the lid 80 is open to provide access to the inside of the storage box 36 and pocket 78.

FIG. 12A additionally shows a lock 104 useable to lock the lid in the closed condition to secure the storage box. In this manner, the storage box 36 provides a lockable enclosed storage container that is can be mounted to the side of the vehicle.

In some embodiments, the storage box 36 may be configured to inhibit removal of the accessory 14 when the storage box is in a closed condition, i.e. when the lid 80 is closed. For example, cover parts 59 may be provided to cover the second attachment means 34 such that, in the illustrated embodiment, the bolts 58 are not accessible for removal when the cover parts 59 are in place. The cover parts 59 may be attached and removed when the lid 80 is open. However, when the lid 80 is closed, the lid 80 may be configured to at least partially cover or otherwise inhibit access to the cover parts 59, thereby inhibiting the removal of the cover parts 59 and thus inhibiting access to the bolts 58 of the second attachment means 34.

It will be appreciated that in the foregoing embodiments where reference is made to a first attachment means 32 and a second attachment means 34 of the automobile accessory the description can be applied to embodiments where there are two or more of each first and second attachment means. It is possible to have two or more of each first and second attachment means, as shown in the figures, to provide stability to the automobile accessory when fixed to the automobile.

FIGS. 1 and 12A and 12B show the automobile accessory applied to a left hand side 108 of the automobile 10 based on the standard direction of facing of the automobile. However, the automobile accessory can similarly be applied to the right hand side 110 of the automobile and such an embodiment is within the scope of the disclosure. The sides 18 of the automobile are shown to incline inwards by an angle 112. The opening of the lid 80 is configurable to achieve a substantially horizontal open condition based on the angle of the automobile sides 18. Other arrangements may be useful and are within the scope of the disclosure.

It will be appreciated that various changes and modifications can be made to the present disclosure without departing from the scope of the present application.

The figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An automobile accessory, the automobile accessory being a storage container comprising first and second attachment means configured to engage with attachment locations provided on an automobile to mount the automobile accessory to the automobile, wherein:
   the first attachment means comprises a first fixing element configured to engage with a first attachment location on a roof of the automobile when the automobile accessory is mounted on a side of the automobile;
   the second attachment means comprises a second fixing element configured to engage with a second attachment location on the side of the automobile at or above a waistline of the automobile such that the automobile accessory, when mounted to the automobile, is mounted on the side of the automobile; and
   the storage container comprises a backboard, the backboard comprising the second attachment means.

2. The automobile accessory according to claim 1, wherein the first attachment location on the roof of the automobile is a roof rail and the first fixing element is configured to engage with the roof rail.

3. The automobile accessory according to claim 1, wherein the first attachment means of the automobile accessory comprises an arm configured to extend, in use, over a longitudinal edge of the roof of the automobile, and the first fixing element is configured to attach an end of the arm to the first attachment location on the roof of the automobile.

4. The automobile accessory according to claim 3, wherein the arm is shaped to follow an external profile of the side of the automobile.

5. The automobile accessory according to claim 3, wherein the arm comprises a smooth a-surface.

6. The automobile accessory according to claim 3, wherein the arm is made from a non-metallic material.

7. The automobile accessory according to claim 1, wherein the first attachment means of the automobile accessory comprises a first arm and a second arm, each of the first arm and the second arm being configured to extend, in use, over the longitudinal edge of the roof of the automobile and spaced longitudinally with respect to the automobile.

8. The automobile accessory according to claim 1, wherein the second attachment means comprises a flange comprising an aperture through which the second fixing element is able to pass.

9. The automobile accessory according to claim 1, wherein the second fixing element is configured to engage with the second attachment location positioned within a waistline reinforcement structural component of the automobile.

10. The automobile accessory according to claim 1, wherein the second fixing element comprises a bolt and a seal member having a bore through which the bolt passes, the seal member being compressible to form a seal when the bolt of the second fixing element is fixed to an automobile component.

11. An automobile comprising the automobile accessory according to claim 1.

12. The automobile accessory according to claim 1, wherein the backboard is fixable to the first attachment means.

13. The automobile accessory according to claim 1, wherein the storage container comprises a wall section, the backboard and the wall section combining to form a body of the storage container.

14. The automobile accessory according to claim 13, wherein the storage container comprises a lid, the body and the lid defining a storage compartment of the storage container.

15. The automobile accessory according to claim 14, wherein the lid is configured to enable access to the storage compartment via an opening when the storage container is mounted to the automobile.

16. The automobile accessory according to claim 15, wherein the opening is defined by the wall section.

17. The automobile accessory according to claim 16, wherein a seal is provided between the wall section and the lid when the lid is closed.

18. The automobile accessory according to claim 14, wherein the lid is coupled to the wall section such that the lid opens in a vertical direction to form a canopy over the storage container.

19. The automobile accessory according to claim 14, wherein an over centre mechanism is provided between the wall section and the lid to hold the lid in an open position.

* * * * *